(12) United States Patent
Wanke et al.

(10) Patent No.: US 11,060,941 B2
(45) Date of Patent: Jul. 13, 2021

(54) METHOD FOR DETERMINING AN UNBALANCE OF A SHAFT-ELASTIC ROTOR WITH REFERENCE TO THE OUTWARD DEFLECTION

(71) Applicant: Schenck RoTec GmbH, Darmstadt (DE)

(72) Inventors: Thomas Wanke, Gross-Umstadt (DE); Matthias Hartnagel, Bensheim (DE)

(73) Assignee: Schenck RoTec GmbH, Darmstadt (DE)

(*) Notice: Subject to any disclaimer, the term of this patent is extended or adjusted under 35 U.S.C. 154(b) by 97 days.

(21) Appl. No.: 16/445,884

(22) Filed: Jun. 19, 2019

(65) Prior Publication Data

US 2019/0391032 A1  Dec. 26, 2019

(30) Foreign Application Priority Data

Jun. 26, 2018 (DE) ...................... 10 2018 115 363.5

(51) Int. Cl.
*G01M 1/24* (2006.01)
*F01D 5/02* (2006.01)
(Continued)

(52) U.S. Cl.
CPC ............... *G01M 1/24* (2013.01); *F01D 5/027* (2013.01); *F16F 15/322* (2013.01); *G01M 1/28* (2013.01)

(58) Field of Classification Search
CPC ........... F01D 5/027; G01M 1/14; G01M 1/24; G01M 1/28; F16F 15/322
See application file for complete search history.

(56) References Cited

U.S. PATENT DOCUMENTS 5,140,534 A * 8/1992 Miller ..................... G01M 1/16
33/203.15
5,214,585 A * 5/1993 Ehrich .................. F16F 15/322
73/462
(Continued)

FOREIGN PATENT DOCUMENTS

DE  2 407 705 A1  9/1974
DE  40 19 721 A1  1/1991
(Continued)

OTHER PUBLICATIONS

W. Kellenberger, "Elastisches Wuchten" (elastic balancing), Berlin 1987, pp. 317 to 325, with English summary.
(Continued)

*Primary Examiner* — Natalie Huls
(74) *Attorney, Agent, or Firm* — Collard & Roe, P.C.

(57) ABSTRACT

In a method for determining an equivalent modal unbalance for the first bending characteristic form of a shaft-elastic rotor, which unbalance is to be compensated for, a rotor model is created describing the geometric shape and material properties of the shaft-elastic rotor. The magnitude of compliance of the rotor model is calculated at a measurement point and at the center of gravity of the rotor at an assumed speed. The shaft-elastic rotor is received in a rotatable bearing and accelerated to the assumed speed which is below its first critical speed. Subsequently, the magnitude of outward deflection at the measurement point of the shaft-elastic rotor rotating at the assumed speed can be measured. The equivalent modal unbalance for the first bending characteristic form of the shaft-elastic rotor, which unbalance is to be compensated for, can be calculated from the magnitudes of the calculated compliance and the measured outward deflection.

7 Claims, 1 Drawing Sheet

(51) Int. Cl.
    *F16F 15/32*     (2006.01)
    *G01M 1/28*     (2006.01)

(56) References Cited

U.S. PATENT DOCUMENTS

| | | | | |
|---|---|---|---|---|
| 5,724,271 | A * | 3/1998 | Bankert | F01D 5/027 |
| | | | | 701/124 |
| 6,044,553 | A * | 4/2000 | Thormann | G01M 1/14 |
| | | | | 29/889.1 |
| 9,182,311 | B2 * | 11/2015 | Clark | F01D 5/16 |
| 9,604,322 | B2 * | 3/2017 | Walters | F01D 5/027 |
| 10,267,703 | B2 * | 4/2019 | Rix | F01D 25/285 |
| 10,823,632 | B2 * | 11/2020 | Trukenmueller | G01M 1/24 |
| 2003/0205086 | A1 * | 11/2003 | Stalsberg | G01M 1/22 |
| | | | | 73/460 |
| 2008/0075592 | A1 * | 3/2008 | Lee | F01D 5/027 |
| | | | | 416/1 |
| 2016/0018814 | A1 * | 1/2016 | Peuchot | G05B 19/4099 |
| | | | | 700/98 |
| 2016/0033006 | A1 * | 2/2016 | Leverington | G01M 1/12 |
| | | | | 700/279 |
| 2019/0243932 | A1 * | 8/2019 | Schlaich | G06F 30/15 |

FOREIGN PATENT DOCUMENTS

| | | |
|---|---|---|
| DE | 30 44 440 C2 | 9/1991 |
| DE | 10 2010 063 812 A1 | 6/2012 |
| FR | 2 219 564 A1 | 9/1974 |

OTHER PUBLICATIONS

Summary of W. Kellenberger, "Elastisches Wuchten" (elastic balancing), Berlin 1987, pp. 317 to 325.

* cited by examiner

METHOD FOR DETERMINING AN UNBALANCE OF A SHAFT-ELASTIC ROTOR WITH REFERENCE TO THE OUTWARD DEFLECTION

CROSS REFERENCE TO RELATED APPLICATIONS

Applicants claim priority under 35 U.S.C. § 119 of German Patent Application No. 10 2018 115 363.5 filed Jun. 26, 2018.

FIELD OF THE INVENTION

The invention relates to a method for determining an equivalent modal unbalance for the first bending characteristic form of a shaft-elastic rotor, which unbalance is to be compensated for.

BACKGROUND OF THE INVENTION

During low-speed balancing of rigid rotors which have simple cylindrical forms, the resultants of all individual unbalances are usually measured in the left and right bearing planes and are optionally compensated for in two planes. Thus, a rigid rotor rotates free of bearing forces generated by unbalance. Since the mass imbalances are generally distributed over the entire length of a rotor, internal bending moments remain in the rotor, however, as a result of the centrifugal forces generated by the individual unbalances. In the case of elastic rotors, these forces, which increase with the square of the speed, can lead to impermissibly large deformations, which in turn cause further unbalance effects.

Theoretically, a rotor has an infinite number of critical speeds. In order to assess the oscillation behaviour at a specific speed, only the critical speeds of which the deflection shapes interfere are taken into account. In practice, it is usually sufficient to take into account a critical speed which excites a rotor to shaft elasticity. A simple roller-shaped rotor will therefore deflect in a v-shaped manner close to the first critical speed, in an s-shaped manner close to the second critical speed, and in a w-shaped manner close to the third critical speed. The deflection shapes associated with these critical speeds are also referred to as the characteristic forms of the rotor, and the associated critical speeds are also referred to as speeds of the characteristic forms.

A balancing method for an elastic rotor which is operated at critical or near-critical speeds is known from DE 40 19 721 A1, which method comprises compensation in three or more balancing planes, using combinations of general unbalance distributions of the rotor and predetermined characteristic forms, without actually balancing the rotor at critical speeds. Corrections are determined, in a conventional manner, in an unbalance measuring run at low speed, and are made in two balancing planes of the rotor. In addition, a third correction is made to the rotor that is proportional to the first and second correction and to the unbalance/mode shape combination. After an additional unbalance measuring run at low speed, which is used as a test weight run with regard to the third correction, corrections for the first and second balancing planes are then again determined and made for the final balancing of the rotor in said planes.

A similar method during which balancing takes place also at low speed, i.e. at a speed which is far below the operating speed, can be found in DE 24 07 705. Ratios of the operation at the operating speed are thereby simulated.

In the technical book by W. Kellenberger, "Elastisches Wuchten", Berlin 1987, pages 317 to 325, a computer-assisted influence coefficient method using test weights is described, in which both the rigid body compensation and the shaft-elastic deflection is eliminated or reduced by means of jointly calculated balancing weights. For this purpose, in addition to an initial unbalance measuring run, at least as many unbalance measuring runs using test weights are required as balancing planes are provided. When taking into account the first critical speed, at least four unbalance measuring runs would therefore be necessary. Since, according to this method, the influence coefficients obtained during the measuring runs using test weights are stored in the computer, subsequent similar rotors can then, in the most favourable case, be balanced using just one unbalance measuring run. In any case, however, when balancing rotors for the first time, they should be equipped with test weights and test weight runs should be carried out in accordance with the number of balancing planes to be taken into account.

DE 30 44 440 C2 discloses determining shaft oscillations of an elongate rotor, which oscillations are generated by unbalance, in which components of the measured variables are detected in one or more measuring planes in at least two measuring directions via displacement transducers. Two measuring runs at speeds close to standstill and close to the operating speed of the rotor are required. Mutually corresponding measured variable components from the two measuring runs are evaluated for the separation of the static and kinetic outward deflection proportions. Test weight runs are used to determine the balancing weights from the resulting outward deflections.

A disadvantage of the prior art is that the calculation of the unbalance is complex and test weights generally have to be set.

SUMMARY OF THE INVENTION

The aim of the invention is to provide a simple method for approximately determining the modal unbalance of a rotor without setting test weights.

The aim is achieved according to the invention in that a method is provided for determining an equivalent modal unbalance for the first bending characteristic form of a shaft-elastic rotor, which unbalance is to be compensated for, characterised by the steps of:

creating a rotor model, in particular a numerical model, which describes the geometric shape and the material properties of the shaft-elastic rotor;

calculating the magnitude of the static compliance of the model of the rotor at at least one point of measurement and at the centre of gravity of the rotor at at least one assumed speed;

receiving the shaft-elastic rotor in a rotatable bearing and accelerating the rotor to the assumed speed which is below its first critical speed;

measuring the magnitude of the outward deflection at the point of measurement of the shaft-elastic rotor rotating at the assumed speed;

calculating the equivalent modal unbalance for the first bending characteristic form of the shaft-elastic rotor, which unbalance is to be compensated for, from the magnitudes of the calculated compliance and the measured outward deflection.

The rotor outward deflection is generated by centrifugal forces, which are produced from the axially distributed unbalances in the rotor interior during rotation. The magnitude of the deflections depends directly on the geometry and material properties of the rotor, and on the distribution of the unbalance. The static compliance of the rotor at at least one point of measurement and at the centre of gravity of the rotor can be calculated by means of known mathematical methods. For example, the compliance can be calculated using an analytical or numerical calculation method (FEM) by means of a static approach, i.e. without taking the rotor dynamics into account.

In contrast, the outward deflection is measured at the at least one point of measurement of the shaft-elastic rotor rotating at the assumed speed. It may be advantageous to measure the outward deflection at several points of measurement. From these data, i.e. from the compliance and the measured outward deflection, the equivalent modal unbalance for the first bending characteristic form of the shaft-elastic rotor, which unbalance is to be compensated for, can be calculated. The method thus represents a simple and cost-effective method for calculating the unbalance on a shaft-elastic rotor. If the rotor geometry, material properties and outward deflection at at least one speed are known, the associated equivalent rotor unbalance that generates the deflection can be calculated. The calculated unbalance can subsequently be compensated for at least one point. The advantage of the invention is that an approximation method is provided that requires only a simple rotor model without taking rotor-dynamic effects into account and is based on static outward deflection of the rotor as a result of the estimated unbalance.

In order to also detect more complex geometries, the rotor model can be carried out in a preferred embodiment according to the finite element method. The method can thus also be applied to more complex rotors.

It is preferred that the vector quantity of the outward deflection of the shaft-elastic rotor is measured by means of a contactless displacement transducer which detects a point on the outer circumference of the rotor.

It may be advantageous that a bearing of the shaft-elastic rotor is taken into account when creating the rotor model. The calculation of the unbalance is made even more accurate thereby. However, the bearing can also be assumed to be infinitely rigid for the rotor model in the vertical direction, such that it plays substantially no role in the calculation.

Furthermore, a radial runout error of the rotor can be compensated for at the point of measurement. For this purpose, for example, a measurement can be made at a low speed close to 0 such that the radial runout error dominates and still no outward deflection occurs.

In a preferred embodiment, the rotor is accelerated to a speed which corresponds to a maximum of 50% of its first critical speed. It has been found that the method according to the invention is particularly efficient up to a speed which is approximately 50% of the first critical speed of the rotor, and only has a low method inaccuracy of less than 5%.

In a further preferred embodiment, the rotor is accelerated to a speed which corresponds to a maximum of 30% of its first critical speed. The preferred method is very accurate at a speed of this kind. The unbalance of shaft-elastic rotors can thus be determined by means of a simple and fast method which requires little effort.

BRIEF DESCRIPTION OF THE DRAWINGS

The invention will be explained in more detail with reference to embodiments of the invention, which are illustrated in the drawings, in which:

FIG. 1 shows a rotor which is to be compensated for, and

DETAILED DESCRIPTION OF THE DRAWINGS

Figure 1:
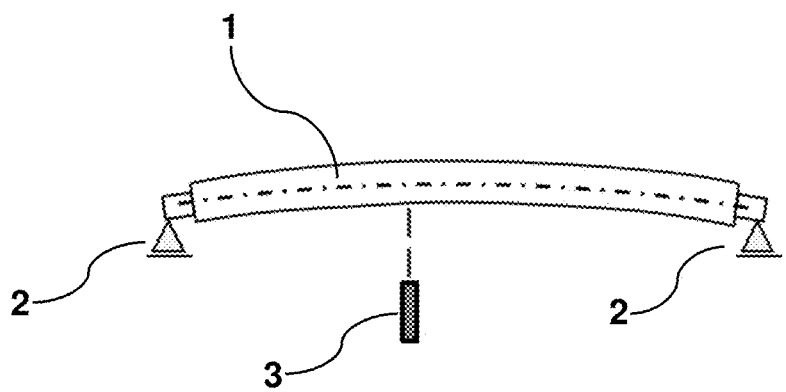

FIG. 1 shows a rotor which is to be compensated for. A shaft-elastic rotor 1 is rotatably mounted in bearings 2. The rotor 1 has an unbalance which is to be compensated for. The rotor 1 is accelerated by means of a corresponding drive to a previously defined speed which is preferably below the first critical speed of the rotor 1.

An outward deflection of the rotor 1 is measured at the speed at at least one point. The vector quantity of the outward deflection of the shaft-elastic rotor 1 can be measured by means of a contactless displacement transducer 3 which detects a point on the outer circumference of the rotor 1. The displacement transducer 3 detects a radial deflection of the rotor 1 at the point of measurement. Examples of displacement transducers 3 are capacitive or inductive displacement transducers (eddy current sensors) or laser triangulation sensors. The measurement data from the displacement transducer 3 can be forwarded to an evaluation unit.

In addition, a rotor model is formed. This can also be calculated by the evaluation unit. This is a simple numerical model, for an open tube or a solid shaft, for example, that does not take rotor-dynamic effects into account. However, more complex geometries can also be used, such as a rotor comprising end plates and pins. Material properties, such as the modulus of elasticity and density, and geometric data, such as length, wall thickness and/or diameter, are detected from the rotor 1.

If the rotor 1 has a complex geometry, the rotor model can be created, for example, according to the finite element method. However, other numerical methods can also be used.

It has been found that the magnitude of the force which generates the outward deflection can be calculated from the measured outward deflection (magnitude and position) by means of the rotor model. When considered while ignoring the rotor-dynamic effects, this force consists of two components, the consideration being particularly advantageous in particular up to a speed of approximately 50% of the first critical speed. The first component corresponds to the force, due to the unbalances distributed axially in the rotor 1 at the selected measuring speed. The second component corresponds to the force due to additional unbalances caused by mass displacement (outward deflection) at the measuring speed. Since the second component is caused by the first component, it is sufficient to eliminate the first component in order to eliminate the total force. By means of the method, it is mathematically possible to determine the first component using the rotor model and the measured value of the outward deflection at a specific speed.

The necessary force for the outward deflection of a rotor 1 at a speed in the elastic range can, in a static consideration which ignores the rotor-dynamic effects (in particular to 50% of the first critical speed), be approximately represented as a function of two force components.

$$F = U_U * \Omega^2 + U_B * \Omega^2$$

$U_U$ is in this case the (distributed) initial unbalance of the rotor 1. $U_B$ is the unbalance component that is produced as a result of the outward deflection and the accompanying mass displacement. This can be represented by the rotor mass $m_W$ and the outward deflection of the centre of gravity $x_S$, or the compliance of the centre of gravity $h_S$ and the outward deflection force F.

$$U_B = m_W * x_S = m_W * F * h_S$$

The total force can be expressed from the compliance $h_W$ of the rotor at the point of measurement (calculated from the rotor model) and the outward deflection $x_W$ of the rotor 1, measured by means of the displacement transducer 3, as follows:

$$F = x_W / h_W$$

The desired value $U_U$ can therefore be represented by the following quantities:

$$U_U = (1 - h_S * m_W * \Omega^2) * \frac{x_W}{h_W} * \frac{1}{\Omega^2}$$

By measuring outward deflection $x_W$ at the known speed $\Omega$ by means of the displacement transducer 3 and entering the rotor parameters (geometry, material properties) into a rotor model and subsequently calculating the compliances of the rotor 1 at the point of measurement $h_W$ and the compliance of the centre of gravity $h_S$ of the rotor, an unbalance acting in an equivalent manner to the distributed unbalance can be calculated, which is the cause of the outward deflection of the rotor. The method for determining this equivalent unbalance for the first bending characteristic form of a shaft-elastic rotor 1 is divided in one embodiment into simple steps such as: creating the rotor model including bearing (analytic for simple geometries or as an FE model for more complex geometries); calculating the compliances of the rotor 1 at the point of measurement and the compliance of the centre of gravity; measuring the outward deflection of the rotor at at least one speed (compensation of the radial runout error of the shaft at the point of measurement is optionally necessary for this purpose); calculating the equivalent unbalance that generates a rotor outward deflection of this kind using the equation described above, for example. The calculated unbalance can be compensated for at at least one point of the rotor 1 by setting a balancing weight to reduce the outward deflection.

Figure 2:
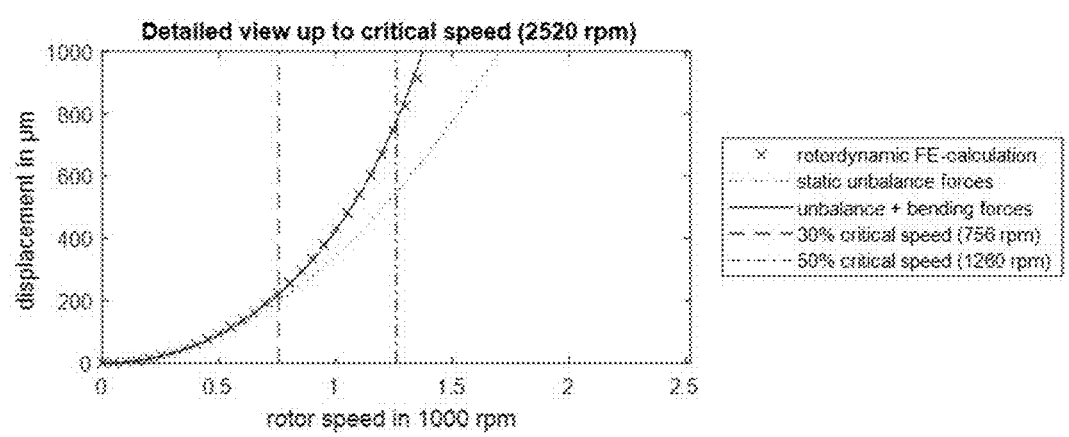
FIG. 2 shows a comparison of different approximation methods for calculating an outward deflection of a rotor.

FIG. 2 shows a comparison of different approximation methods for calculating an outward deflection of a rotor. Different approximation methods for calculating an outward deflection of a rotor were compared, namely a simple static model (only taking into account the unbalance without any influence of the unbalance-induced outward deflection), an embodiment of the method according to the invention and a complex rotor-dynamic calculation. For this purpose, an unbalance was artificially generated on the rotor and the outward deflection at different speeds was calculated using the above approximation methods. It can be seen that the approximation method that only takes the unbalance forces into account deviates by more than 10% from the rotor-dynamic complex calculation at only approximately 20% of the critical speed. The preferred method, which takes into account the mass displacement due to outward deflection (iteratively calculated), differs in the calculated example even at 50% of the critical speed by less than 5% from the rotor-dynamic calculation. This shows that the measurement of the outward deflection can provide information about the unbalance occurring on the rotor.

What is claimed is:

1. A method for determining an equivalent modal unbalance for the first bending characteristic form of a shaft-elastic rotor, which unbalance is to be compensated for, comprising the steps of:
    creating a simple rotor model which describes only the geometric shape and the material properties of the shaft-elastic rotor;
    calculating the magnitude of the static compliance of the model of the rotor at at least one point of measurement and at the center of gravity of the rotor at at least one assumed speed;
    receiving the shaft-elastic rotor in a rotatable bearing and accelerating the rotor to the assumed speed which is below the first critical speed thereof;
    measuring the magnitude of the outward deflection at the point of measurement of the shaft-elastic rotor rotating at the assumed speed;
    calculating the equivalent modal unbalance for the first bending characteristic form of the shaft-elastic rotor, which unbalance is to be compensated for, from the magnitudes of the calculated compliance and the measured outward deflection, without taking rotor-dynamic effects into account.

2. The method according to claim 1, wherein the rotor model is created according to the finite element method.

3. The method according to claim 1, wherein the vector quantity of the outward deflection of the shaft-elastic rotor is measured by means of a contactless displacement transducer which detects a point on the outer circumference of the rotor.

4. The method according to claim 1, wherein a bearing of the shaft-elastic rotor is taken into account when creating the rotor model.

5. The method according to claim 1, wherein a radial runout error of the rotor is compensated for at the point of measurement.

6. The method according to claim 1, wherein the rotor is accelerated to a speed which corresponds to a maximum of 50% of its first critical speed.

7. The method according to claim 1, wherein the rotor is accelerated to a speed which corresponds to a maximum of 30% of its first critical speed.

\* \* \* \* \*